United States Patent [19]
Conway et al.

[11] Patent Number: 5,372,390
[45] Date of Patent: Dec. 13, 1994

[54] COUPLING SYSTEM FOR RELATIVELY THICK-WALLED TUBES

[75] Inventors: Donald J. Conway, Glen Ellyn; Darius C. Matonis, Glendale Heights, both of Ill.

[73] Assignee: Senior Engineering Investments, B.V., Amsterdam, Netherlands

[21] Appl. No.: 22,074

[22] Filed: Feb. 24, 1993

[51] Int. Cl.⁵ ............................................. F16L 3/04
[52] U.S. Cl. .................... 285/158; 285/229; 285/286
[58] Field of Search ............ 285/189, 225, 226, 229, 285/158, 286

[56] References Cited

U.S. PATENT DOCUMENTS

| | | | |
|---|---|---|---|
| 1,015,180 | 1/1912 | Heitman | 285/226 X |
| 1,342,133 | 6/1920 | Sargent | 285/226 |
| 2,843,995 | 7/1958 | Furstenberg | 285/225 X |
| 3,355,190 | 11/1967 | Francis | 285/226 X |

Primary Examiner—Dave W. Arola
Attorney, Agent, or Firm—Dick and Harris

[57] ABSTRACT

A coupling system for maintaining an end of a tube in substantially sealed alignment within an aperture in a wall, in which the tube is held by a clamp member affixable to the wall adjacent the aperture. A tube end is provided which is formed by a first tube tip member and a second tube tip member which fits concentrically around the first tube tip member. The second tube tip member has a wall thickness substantially less than that of the first tube tip member, and has a radially outwardly projecting annular bead formed thereon. The first tube tip member and the second tube tip member are affixed to each other, but limited axial movement of a portion of the first tube tip member relative to a portion of the second tube tip member is permitted.

12 Claims, 1 Drawing Sheet

COUPLING SYSTEM FOR RELATIVELY THICK-WALLED TUBES

BACKGROUND OF THE INVENTION

The present invention relates to coupling systems for mounting tubes obliquely onto surfaces where the surface and the tube may be undergoing relative vibration, and particularly, to coupling systems for mounting tubes to components of a vehicle motor.

A modern motor vehicle requires or is provided with a variety of accessory apparatus which involve the use of tubes to transmit pressurized fluid (such as exhaust) or to provide a vacuum, to a portion of the motor block, carburetor, intake or exhaust manifolds, or other component. For example, an EGR (Exhaust Gas Recirculation) tube directs hot exhaust gases from the exhaust manifold or other part of the exhaust system, to the carburetor or air intake manifold, which improves fuel efficiency, and as well, improves the quality of the vehicle exhaust emissions.

Typically, the tube will be insertingly received at one end directly into an aperture provided in the sidewall of a motor component. The end of the tube may be provided with an outwardly extending, annular bead, to, in part, limit the extent to which the tube extends into the sidewall of the motor component, and as well to provide a surface a clamp member to bear on, to hold the tube end in place. In addition, the bead serves to create a seal between the wall of the engine component and the clamp member, which is typically a simple plate-like retainer member with a bolt extending through one end of the plate-like member into the wall of the motor component. The annular bead is typically simply formed as a corrugation mechanically formed into the end of the tube. When the clamp member is tightened down against the wall of the motor component, the bead, being fabricated from relatively thin and flexible metal material, axially compresses, slightly to form a tight sealing fit between the tube, the aperture and the wall and clamp member.

A typical prior art tube, such as may be used to draw off exhaust gases from an exhaust manifold in a automotive engine, will have an outside diameter to wall thickness ratio of 39:1 to over 62:1. For example, a tube having a wall thickness of 0.012 inches may be formed with an outside diameter of 0.625 inches. In such a tube material, an outwardly projecting annular bead can be formed which may have a radius of, for example, 0.10 inches, extend radially outwardly from the outer diameter of the tube a distance of about 0.11 inches, and have a thickness (measured along the direction of the tube) of about 0.25 inches. The use of such thin-walled tubular material is not practical in some environments. For example, in the environment of a larger engine, thus requiring longer developed tube length, or in an environment where substantially robust duty life is required, with external damage potential, such thin-walled tubes may not be durable enough, or economically practical. Accordingly, it is desirable to employ a tube having a much lower ratio of the outside diameter to the wall thickness. Such a more robust tube may have a ratio of outside diameter to wall thickness of between 17:1 and 20:1. For example, an outside diameter of 0.6 inches would be accompanied by a tube wall thickness of 0,035 inches.

An effective seal at the point of connection of such a thick-walled tube to an engine component housing is difficult to obtain, for the reason that the relatively thicker-wailed tube does not permit the forming of a desirable annular bead having overall dimensions and spring rate similar to those in an annular bead which can be readily formed in a thin-walled tube. The thicker material, when formed into a bead shape, will not deflect elastically under required clamp pressure, leading to undesirable leakage, possible damage or hazard, and inefficiency.

Accordingly, it is desirable to provide a thicker-walled tube for use in such situations as an EGR tube, for use in heavier duty environments, but which is capable of being sealingly connected to the appropriate component housing in as effective a manner as can be achieved with thin-walled tubes.

One possible solution to this problem, is to affix beyond the end of a thick-walled tube a short extension adapter section of thin-walled tube into which an appropriate annular bead has been formed. The two components are slightly overlapped and welded or brazed. While the adapter extension formed of the thin-walled tube enables an effective sealing connection to be provided, the composite tube which has been formed would prove unsatisfactory in that the thin-walled adapter extension is susceptible to the vibration and other thermal or mechanical forces exerted upon it by the mass of the thick-walled tube. The greater, substantial mass of the remaining length of the heavier tube exerts potentially destructive force on the thin-walled adapter extension, as the tube length grows thermally and moves under the vibrations of the operating engine.

Accordingly, it is desirable to provide a coupling system for connecting a relatively thick-walled tube to a wall, for example, of a motor component, which has the benefit of the features of a thin-walled tube coupling.

A further object of the invention is to provide a coupling system which has a composite construction utilizing a thin-walled tube adapter portion which is operably connected to a tube end of a thick-walled tube.

Still another object of the invention is to provide such a coupling system which is more able to withstand the vibration and stresses associated with continued operation, with enhanced durability of the seal formed between the bead and the aperture, and improve the connection joint strength between the thin-walled tube adapter portion and the thick-walled tube end.

These and other objects of the invention will become apparent in light of the present specification, claims and drawings.

SUMMARY OF THE INVENTION

The present invention is directed to a coupling system for maintaining an end of a tube in substantially sealed, insertably received alignment within an aperture in a wall, of the type in which the tube end is insertably receivable by a clamp member which is, in turn, affixable to the wall adjacent the aperture. The coupling system comprises a tube end having an axis and formed by a first tube tip member and a second tube tip member. The first tube tip member is formed substantially contiguously with the tube and has the first tube wall-thickness, a first tube outer diameter, and a first tube tip member end edge. The second tube tip member has a second tube wall-thickness, a second tube outer diameter, and a second tube tip member end edge. The first tube tip member is insertingly and substantially concentrically received within the second tube tip member. The first tube tip member end edge is operably alignable with the second tube tip member end edge.

The coupling system further comprises a substantially radially outwardly projecting, annular bead operably formed in the second tube tip member and positionable between the wall and the clamp member when the tube end is in the insertably received alignment within the aperture, to provide a seal between the tube end and the aperture in the wall. The bead is formed as a corrugation in the second tube tip member. The coupling system further includes means for affixing the second tube tip member to the first tube tip member while enabling at least limited axial movement of at least a portion of the second tube tip member relative to at least a portion of the first tube tip member.

In the preferred embodiment of the invention, the ratio of the first tube outer diameter to the first tube wall thickness is substantially less than the ratio of the second tube outer diameter to the second tube wall thickness.

In the preferred embodiment of the invention, the second tube tip member has a length substantially less than the overall length of the tube. The means for affixing the second tube tip member to the first tube tip member comprises a joint operably formed between the first tube tip member and the second tube tip member.

In the preferred embodiment of the invention, the first tube tip member end edge and the second tube tip member end edge are aligned and the joint is formed between the aligned end edges.

In an alternative embodiment of the invention, the second tube tip member has a second end edge opposite the second tube tip member end edge and the bead is positioned between the second tube tip member and edge and the opposite end edge, with the joint formed between the first and second tube tip members at a position joining the second end edge opposite the second tube tip member end edge to the first tube tip member. The joint connecting the first tube tip member and the second tube tip member may be either a weld or a braze.

In a preferred embodiment of the invention, the first tube tip member has a first tube outer diameter to first tube wall-thickness ratio of from 17:1 to 20:1 and the second tube tip member has a second tube outer diameter to second tube wall thickness ratio of from 39:1 to 63:1.

DETAILED DESCRIPTION OF THE DRAWINGS

Figure 1:
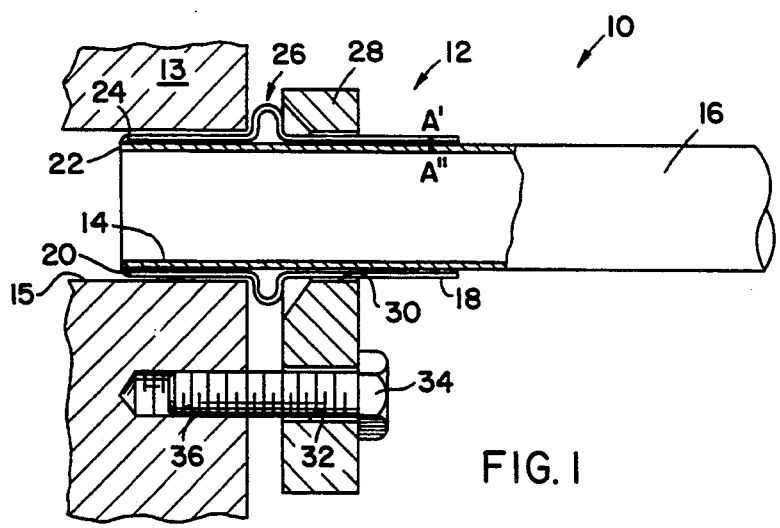
FIG. 1 is a side elevation, partly in section, of the coupling system according to a preferred embodiment of the invention, shown with the clamp member, in a loose, un-tightened position.

While this invention is susceptible of embodiment in many different forms, there is shown in the drawings and will be described in detail herein several embodiments, with the understanding that the present disclosure is to be considered as an exemplification of the principles of the invention and is not intended to limit the invention the embodiments illustrated.

One embodiment of the coupling system according to the present invention is shown in FIG. 1. Coupling system 10 includes tube end 12, which is formed by first tube tip member 14, which is a merely the innermost end of tube 16, and second tube tip member 18. First tube tip member 14 insertably received within second tube tip member 18. A joint 20 joins first and second tube tip members 14 and 18, respectively, at their aligned end edges 22 and 24, respectively. Second tube tip member 18 has an outwardly-projecting annular bead 26 formed therein, at a distance away from end edge 24. Second tube tip member 24 is a relatively thin-walled tube, having a ratio of outside diameter to wall thickness of from 39:1 to 63:1. For example, the outside diameter (not including the bead portion) may be 0.625 inches, while the wall thickness may be 0.012 inches. In such a relatively thin-walled member, annular bead 26 may be readily formed, by known techniques.

First tube tip member 14 is, in the preferred embodiment of the invention, simply the contiguously formed end of relatively thick-walled tube 16, which at its far end (not shown) may be connected to another engine component housing. First tube tip member 14, like the remainder of tube 16, has a wall thickness to outside diameter ratio which is substantially less than that of second tube tip member 18. Specifically, the outside diameter to wall thickness ratio is preferably on the order of from 17:1 to 20:1. For example, the wall thickness may be 0.035 inches, while the outside diameter of a typical tube may be 0.6 inches.

First tube tip member 14 is configured to be insertingly received within second tube tip member 18, preferably with a sliding fit, so that, except as described hereinafter, first tube tip member 14 may move axially within and relative to second tube tip member 18. As previously mentioned, a joint 20 connects and affixes together first tube tip member 14 and second tube tip member 18 at end edges 22 and 24, respectively. Joint 20 may be a weld or a braze, or similar permanent connection. In any event, first tube tip member 14 and second tube tip member 18 are joined together at their respective end edges 22 and 24, in the embodiment of FIGS. 1 and 2, or between the mating surfaces immediately adjacent to end edges 22 and 24.

Clamp member 28 is provided in order to hold tube end 12 against wall 13 in sealing alignment with and within aperture 15. Clamp member 28 is typically formed as a simple, plate-like member having a first aperture 30 which is configured to insertingly receive tube end 12 with a snug, but freely sliding fit, around the outside diameter of tube tip member 18. Adjacent to first aperture 30, a second aperture 32 permits the passage therethrough of a bolt 34, which is configured to be received within blind bore 36. Second aperture 32 typically is not threaded.

Figure 2:
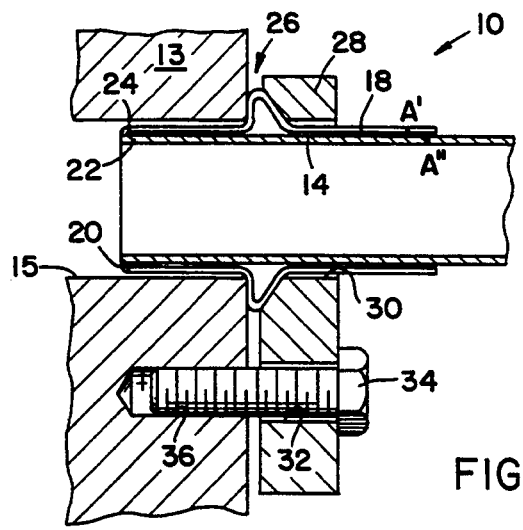
FIG. 2 is a side elevation, partly in section according to the embodiment of FIG. 1, showing the clamp member in a tightened-down position.

In the arrangement shown in FIG. 1, bolt 34 has not yet been tightened. Bead 26 is shown in its initial, undeformed state. To illustrate the mode of operation of the coupling system 10, in the embodiments of FIGS. 1 and 2, two references points, A' and A", are identified on second tube tip member 18 and first tube tip member 14, respectively. In the configuration of FIG. 1, points A' and A" are both the same distance from wall 13. As bolt 34 is tightened, clamp member 28 is drawn toward wall 13. Bead 26, which is arranged between wall 13 and clamp member 28, yields under the pressure of clamp member 28, becoming thinner, with respect to the axial direction, and becoming wider, with respect to the radial direction. Bead 26 is, preferably, not totally crushed, as shown in FIG. 1, although in an alternative embodiment, for example, a clamp member not having a beveled tube aperture, it may be. As bead 26 is deformed, the portion of second tube tip member 18 which extends axially outwardly beyond bead 26 is drawn toward bead 26. This can be seen by observing the axial movement of point A' relative to point A", as shown in FIG. 2. Because the fit between first tube tip member 14 and second tube tip member 18 is preferably a slip fit, the tightening of bolt 34 results in no significant forces acting directly upon first tube tip member 14. End edges 22 and 24 of first tube tip member 14 and second tube tip member 18, respectively, remain together in aligned configuration, being held in place by joint 20.

Once fully installed, coupling system 10 provides a secure sealed alignment of tube end 12 to aperture 15, utilizing the advantages of the thin-walled tube construction of second tube tip member 18. By placing joint 20 at or near end edges 22, 24, a seal between first tube tip member 14 and second tube tip member 18 is provided, which prevents the fluid being conducted, for example, hot corrosive exhaust gases, from getting between tube tip members 14 and 18.

Figure 3:
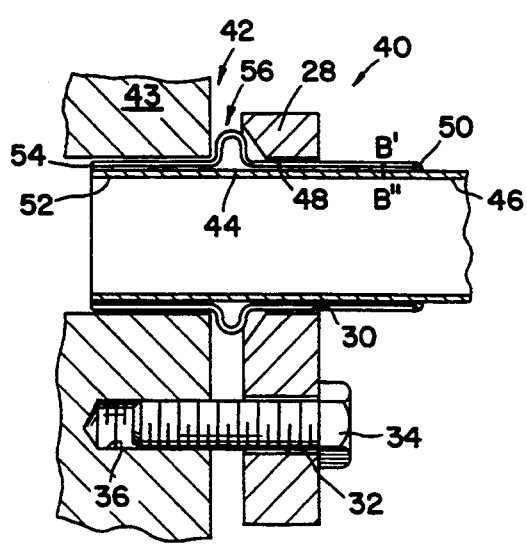
FIG. 3 is a side elevation, partly in section, of the coupling system according to an alternative preferred embodiment of the invention, shown with the clamp member, in a loose, un-tightened position.
Figure 4:
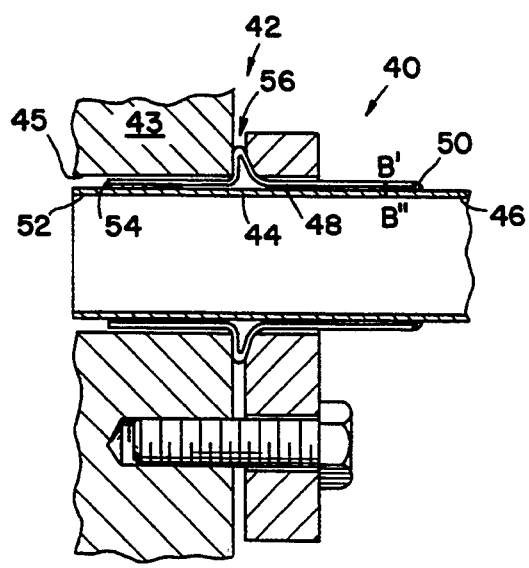
FIG. 4 is a side elevation, partly in section, of the coupling system according to the embodiment of FIG. 3, shown with the clamp member in a tightened-down position.

An alternative embodiment of the invention is shown in FIGS. 3 and 4. Coupling system 40 comprises tube end 42, which is configured to be insertably received within aperture 45 of wall 43. Tube end 42 is formed from first tube tip member 44, contiguously formed with tube 46. First tube tip member 44 is insertingly received, preferably with a sliding fit, within second tube tip member 48. In the same manner as the embodiment of FIGS. 1 and 2, second tube tip member 48 has an annular bead 56 formed therein as a simple corrugation of the thin-walled material. For ease of illustration, coupling system 40 is shown in FIG. 3 with end edges 52 and 54 of first tube tip member 44 and second tube tip member 48, respectively, aligned, although in an alternative embodiment, they need not be aligned.

Clamp member 28 and bolt 34 operate in the manner previously described to affix tube end 42 to wall 43. In the configuration shown in FIG. 3, bolt 34 has not yet been tightened and bead 56 is shown in its undistorted shape. Again, for ease of illustration of the mode of operation of coupling system 40, two points B' and B" are identified at corresponding positions on first tube member 44 and second tube tip member 48. Joint 50, however, is positioned at an opposite end of second tube tip member 48, so as to be to the "outside", axially, of bead 56 and clamp member 28. End edges 52 and 54 are not affixed to each other in any manner, and first tube tip member 44 and second tube tip member 48 are connected only at joint 50.

As bolt 34 is tightened, clamp 28 again presses against bead 56. The outside portion of second tube tip member 48 is drawn toward wall 13 as a result of the deformation of bead 56. Joint 50 exerts a pull on second tube tip member 48, causing second tube tip member 48 to be pulled further into aperture 45 in wall 43. Thus, end edge 52 will project further into aperture 45 than will end edge 54, as shown in FIG. 4. Points B' and B" remain together at all times. Again, preferably, bead 56 is not totally crushed, although in an alternative embodiment, it may be.

In either of the preferred embodiments of the invention, it is shown with a weld or other joint only at one end or the other of the second tube tip member. If joints are positioned at both ends of the second tube tip member, upon tightening down of the clamp member against the annular bead, the bead will collapse when compressed causing leakage, or the material of second tube tip member will be overly strained, especially at the bead, possibly to the point of early material or joint failure.

The coupling system of the present invention has, as an advantageous feature, the reinforcement of the bead and seal, through the presence of the first tube tip member inside providing a lateral support for the bead material of the second tube tip member upon tightening down of the clamp member 28.

The foregoing description and drawings merely explain and illustrate the invention and the invention is not limited thereto except insofar as the appended claims are so limited, as those skilled in the art who have the disclosure before them will be able to make modifications and variations therein without departing from the scope of the invention.

What is claimed is:

1. A coupling system for maintaining an end of a tube in substantially sealed, insertably received alignment within an aperture in a wall, of the type in which the tube end is insertably receivable by a clamp member, which is, in turn, affixable to said wall adjacent said aperture, said coupling system comprising:
   a tube end, having an axis, and formed by a first tube tip member and a second tube tip member,
      said first tube tip member being formed substantially contiguously with said tube and having a first tube wall thickness, a first tube outer diameter, and a first tube tip member end edge,
   said second tube tip member having a second tube wall thickness, a second tube outer diameter, and a second tube tip member end edge,
   said first tube tip member being insertingly and substantially concentrically received within said second tube tip member;
   a substantially outwardly projecting, annular bead operably formed in said second tube tip member and operably positionable between said wall and said clamp member, when said tube end is in said insertably received alignment within said aperture, so that when said clamp member is affixed to said wall, said clamp member forces said annular bead against said wall, to provide, in turn, a seal between said tube end and said aperture in said wall,
   said bead being formed as a corrugation in said second tube tip member; and
   means for sealingly affixing said second tube tip member to said first tube tip member thereby at least a portion of said second tube tip member to said first tube tip member, operably associated with said first and second tube tip members, for enabling at least limited axial movement of at least a portion of said second tube tip member relative to at least a portion of said first tube tip member.

2. The coupling system according to claim 1 wherein the ratio of said first tube outer diameter to said first tube wall-thickness is substantially less than the ratio of said second tube outer diameter to said second tube wall-thickness.

3. The coupling system according to claim 1 wherein said means for affixing at least a portion of said second tube tip member to said first tube tip member comprises:
a joint operably formed between said first tube tip member and said second tube tip member.

4. The coupling system according to claim 3 wherein said first tube tip member end edge and said second tube tip member end edge are substantially aligned and said joint is formed substantially between said substantially aligned end edges.

5. The coupling system according to claim 3 wherein said second tube tip member has a second end edge opposite said second tube tip member end edge, and said bead is between said second tube tip member end edge and said second end edge, and said joint is formed between said first and second tube tip members, substantially at said position adjacent said second end edge, joining said second end edge to said first tube tip member.

6. The coupling system according to claim 3, wherein said joint comprises a weld.

7. The coupling system according to claim 3, wherein said joint comprises a braze.

8. The coupling system according to claim 3, wherein said first tube tip member has a first tube outer diameter to first tube wall thickness ratio of from 17:1 to 20:1, and said second tube tip member has a second tube outer diameter to second tube wall thickness ratio of from 39:1 to 63:1.

9. A coupling system for maintaining an end of a tube in substantially sealed, insertably received alignment within an aperture in a wall, of the type in which the tube end is insertably receivable by a clamp member, which is, in turn, affixable to said wall adjacent said aperture, said coupling system comprising:
a tube end, having an axis, and formed by a first tube tip member and a second tube tip member,
said first tube tip member being formed substantially contiguously with said tube and having a first tube wall thickness, a first tube outer diameter, and a first tube tip member end edge,
said second tube tip member having a second tube wall thickness, a second tube outer diameter, a second tube tip member end edge, and a second end edge opposite said second tube tip member end edge,
said first tube tip member being insertingly and substantially concentrically received within said second tube tip member;
a substantially outwardly projecting, annular bead operably formed in said second tube tip member and operably positionable between said wall and said clamp member, when said tube end is in said insertably received alignment within said aperture, so that when said clamp member is affixed to said wall, said clamp member forces said annular bead against said wall, to provide, in turn, a seal between said tube end and said aperture in said wall,
said bead being formed as a corrugation in said second tube tip member; and
means for sealingly affixing said second tube tip member to said first tube tip member thereby at least a portion of said second tube tip member to said first tube tip member, operably associated with said first and second tube tip members, for enabling at least limited axial movement of at least a portion of said second tube tip member relative to at least a portion of said first tube tip member,
said means for affixing at least a portion of said second tube tip member to said first tube tip member including a joint operably formed between said first tube tip member and said second tube tip member, at one of a position located axially between said bead and said first tube tip member end edge, and a position located axially between said bead and said second end edge.

10. The coupling system according to claim 9, wherein said joint comprises a weld.

11. The coupling system according to claim 9, wherein said joint comprises a braze.

12. A coupling system for maintaining an end of a tube in substantially sealed, insertably received alignment within an aperture in a wall, of the type in which the tube end is insertably receivable by a clamp member, which is, in turn, affixable to said wall adjacent said aperture, said coupling system comprising:
a tube end, having an axis, and formed by a first tube tip member and a second tube tip member,
said first tube tip member being formed substantially contiguously with said tube and having a first tube wall thickness, a first tube outer diameter, and a first tube tip member end edge,
said second tube tip member having a second tube wall thickness, a second tube outer diameter, a second tube tip member end edge, and a second end edge opposite said second tube tip member end edge,
said first tube tip member being insertingly and substantially concentrically received within said second tube tip member;
a substantially outwardly projecting, annular bead operably formed in said second tube tip member and operably positionable between said wall and said clamp member, when said tube end is in said insertably received alignment within said aperture, so that when said clamp member is affixed to said wall, said clamp member forces said annular bead against said wall, to provide, in turn, a seal between said tube end and said aperture in said wall,
said bead being formed as a corrugation in said second tube tip member; and
means for sealingly affixing said second tube tip member to said first tube tip member thereby at least a portion of said second tube tip member to said first tube tip member, operably associated with said first and second tube tip members, for enabling at least limited axial movement of at least a portion of said second tube tip member relative to at least a portion of said first tube tip member,
said means for affixing at least a portion of said second tube tip member to said first tube tip member including a joint operably formed between said first tube tip member and said second tube tip member;
said first tube tip member having a first tube outer diameter to first tube wall thickness ration of from 17:1 to 20:1, and said second tube tip member having a second tube outer diameter to second tube wall thickness ratio of from 39:1 to 63:1.

* * * * *

UNITED STATES PATENT AND TRADEMARK OFFICE
CERTIFICATE OF CORRECTION

PATENT NO. : 5,372,390
DATED : December 13, 1994
INVENTOR(S) : Donald J. Conway; Darius C. Matonis It is certified that error appears in the above-indentified patent and that said Letters Patent is hereby corrected as shown below:

Col. 1, Line 65            After "of" delete "0,035" and insert -- 0.035 --.

Signed and Sealed this

Second Day of May, 1995

Attest:

BRUCE LEHMAN

*Attesting Officer*      *Commissioner of Patents and Trademarks*